United States Patent
Kambe et al.

(10) Patent No.: US 11,500,059 B2
(45) Date of Patent: Nov. 15, 2022

(54) RADAR DEVICE

(71) Applicant: Mitsubishi Electric Corporation, Chiyoda-ku (JP)

(72) Inventors: Shinichi Kambe, Tokyo (JP); Tatsuya Kamimura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 233 days.

(21) Appl. No.: 16/627,641

(22) PCT Filed: Mar. 20, 2018

(86) PCT No.: PCT/JP2018/011117
§ 371 (c)(1),
(2) Date: Dec. 30, 2019

(87) PCT Pub. No.: WO2019/012741
PCT Pub. Date: Jan. 17, 2019

(65) Prior Publication Data
US 2020/0158817 A1     May 21, 2020

(30) Foreign Application Priority Data

Jul. 11, 2017 (JP) .............................. JP2017-135629

(51) Int. Cl.
*G01S 7/03* (2006.01)
*G01S 7/35* (2006.01)
*H01Q 1/32* (2006.01)

(52) U.S. Cl.
CPC ............... *G01S 7/03* (2013.01); *G01S 7/352* (2013.01); *H01Q 1/3233* (2013.01); *H01Q 1/3291* (2013.01)

(58) Field of Classification Search
CPC ......... G01S 7/03; G01S 7/352; H01Q 1/3233; H01Q 1/3291

(Continued)

(56) References Cited

U.S. PATENT DOCUMENTS 4,893,923 A * 1/1990 Javan ....................... G01S 17/02
356/28.5
5,374,903 A * 12/1994 Blanton ............... H03C 3/0983
331/4

(Continued)

FOREIGN PATENT DOCUMENTS

JP    2002-76967 A    3/2002
JP    2002-198852 A    7/2002

(Continued)

OTHER PUBLICATIONS

Office Action dated Jul. 21, 2020 in corresponding Patent Application No. 2019-529441 (with English Translation), 7 pages.

(Continued)

*Primary Examiner* — Bernarr E Gregory
*Assistant Examiner* — Nuzhat Pervin
(74) *Attorney, Agent, or Firm* — Oblon, McClelland, Maier & Neustadt, L.L.P.

(57) ABSTRACT

A radar device includes a transmission module and a reception module disposed separately from the transmission module. The transmission module includes: a transmission circuit unit mounted on the first surface of a circuit board; an antenna substrate provided on the second surface side of the circuit board; and a transmission antenna mounted on the second surface of the antenna substrate and not provided in a range on the back surface side of the antenna substrate corresponding to the range in which the circuit board is disposed. The reception module includes: a reception circuit unit mounted on the third surface of a circuit board; an antenna substrate provided on the fourth surface side of the circuit board; and a reception antenna mounted on the fourth surface of the antenna substrate and not provided in a range on the back surface side of the antenna substrate corresponding to the range in which the circuit board is disposed.

8 Claims, 9 Drawing Sheets

(58) Field of Classification Search
USPC .......................................................... 342/200
See application file for complete search history.

(56) References Cited

U.S. PATENT DOCUMENTS

| | | | | |
|---|---|---|---|---|
| 5,481,268 A * | 1/1996 | Higgins | ................... | G01S 7/35 342/111 |
| 6,686,867 B1 * | 2/2004 | Lissel | ................. | H01Q 25/002 343/753 |
| 6,894,608 B1 * | 5/2005 | Gunderson | ........... | G01S 15/931 340/471 |
| 7,532,160 B1 * | 5/2009 | Zimmerman | ........... | G01S 19/46 342/464 |
| 7,786,949 B2 * | 8/2010 | Kato | ...................... | H01Q 5/371 343/860 |
| 8,013,795 B2 * | 9/2011 | Washiro | ............... | H01Q 9/0442 343/700 MS |
| 8,369,390 B2 * | 2/2013 | Rofougaran | ........... | H01Q 23/00 370/276 |
| 9,118,115 B2 * | 8/2015 | Alexopoulos | ............ | H01Q 1/36 |
| 9,866,265 B2 * | 1/2018 | Saji | ........................ | H01L 24/19 |
| 9,966,648 B2 * | 5/2018 | Liu | ........................ | H01Q 1/125 |
| 10,348,136 B2 * | 7/2019 | John | ...................... | A61N 1/3785 |
| 2005/0035915 A1 * | 2/2005 | Livingston | ............ | H01Q 1/422 343/754 |
| 2005/0151698 A1 * | 7/2005 | Mohamadi | ............... | H01Q 1/38 343/700 MS |
| 2006/0097906 A1 * | 5/2006 | Heide | ..................... | G01S 7/032 342/22 |
| 2008/0278370 A1 * | 11/2008 | Lachner | .................. | G01S 13/87 342/200 |
| 2009/0052360 A1 * | 2/2009 | Kato | ........................ | H04B 1/38 370/310 |
| 2009/0066065 A1 * | 3/2009 | Breed | ............... | B60R 21/01516 340/573.1 |
| 2009/0079648 A1 * | 3/2009 | Matsuo | ................. | H01P 5/1007 343/771 |
| 2013/0079639 A1 * | 3/2013 | Hoctor | ................ | G01S 7/52025 600/447 |
| 2013/0088393 A1 * | 4/2013 | Lee | .......................... | G01S 7/354 342/372 |
| 2015/0234003 A1 * | 8/2015 | Shiozaki | .............. | H05K 1/0268 324/763.01 |
| 2017/0227627 A1 * | 8/2017 | Chanda | ................ | G01S 7/4052 |
| 2018/0011180 A1 * | 1/2018 | Warnick | .................... | H01Q 3/34 |
| 2018/0074191 A1 * | 3/2018 | Bilik | ....................... | G01S 13/88 |
| 2018/0335332 A1 * | 11/2018 | Welle | ...................... | H01Q 3/08 |
| 2019/0302254 A1 * | 10/2019 | Maruyama | ........... | H01Q 21/065 |
| 2019/0339380 A1 * | 11/2019 | Marks | ................... | G01S 13/887 |
| 2021/0072369 A1 * | 3/2021 | Heller | ..................... | G01S 13/36 |
| 2021/0285900 A1 * | 9/2021 | Farrar | ..................... | H01L 35/32 |

FOREIGN PATENT DOCUMENTS

| | | | | |
|---|---|---|---|---|
| JP | 2002198852 A | * | 7/2002 | ............ H04B 1/40 |
| JP | 2004-40571 A | | 2/2004 | |
| JP | 2007104142 A | * | 4/2007 | ............ H01Q 1/22 |
| JP | 4394147 B2 | | 1/2010 | |
| JP | 2011055306 A | * | 3/2011 | ............ H01Q 25/00 |
| JP | 2013-83645 A | | 5/2013 | |

OTHER PUBLICATIONS

International Search Report dated May 15, 2018 in PCT/JP2018/011117 filed Mar. 20, 2018, 2 pages.

* cited by examiner

RADAR DEVICE

FIELD

The present invention relates to a radar device for detecting a target object.

BACKGROUND

In recent years, the development of radar devices that are mounted on automobiles to detect target objects has been advanced. An example of a target object is an automobile that travels in front of a running automobile equipped with a radar device. Another example of a target object is an obstacle located in front of a running automobile equipped with a radar device.

A radar device includes a transmission antenna and a reception antenna. The transmission antenna emits radio waves. The reception antenna receives, from a target object, reflected waves of the radio waves emitted by the transmission antenna. The radar device determines the distance from the automobile to the target object on the basis of the time from the emission of radio waves from the transmission antenna to the reception of reflected waves at the reception antenna. Patent Literature 1 below discloses a high frequency module in which a high frequency package, a transmission antenna, and a reception antenna are formed as a single structure.

CITATION LIST

Patent Literature

Patent Literature 1: Japanese Patent No. 4394147

SUMMARY

Technical Problem

For the conventional high frequency module, the high frequency package, the transmission antenna, and the reception antenna are formed as the single structure, as described above. For this reason, it is difficult to reduce the size of the high frequency module. Therefore, the conventional radar device is problematic because it can be mounted only at a limited place in the front part of an automobile. An example of the limited place is a front grille or a bumper.

The present invention has been made in view of the above, and an object thereof is to obtain a radar device that can be mounted at any place on an automobile.

Solution to Problem

In order to solve the above problem and achieve the object, a radar device according to the present invention includes a transmission module to generate a radar signal and a reception module to receive a reflected wave of the radar signal. The transmission module and the reception module are separately mounted on an automobile. The transmission module including: a transmission circuit unit to generate the radar signal; and a transmission antenna to emit the radar signal into a space. The reception module including: a reception antenna to receive the reflected wave of the radar signal from a target object; and a reception unit including a reception circuit unit to receive an output from the reception antenna and a signal processing unit to calculate target data on a basis of an output from the reception circuit unit. The transmission module includes a first substrate and a first circuit board. The transmission circuit unit is mounted on a first surface of the first circuit board. The first substrate is provided on a second surface side of the first circuit board. The transmission antenna is mounted on a second surface of the first substrate, and is not provided in a corresponding range on a back surface side of the first substrate, the corresponding range on the back surface side of the first substrate corresponding to a range in which the first circuit board is disposed on the first substrate. The reception module includes a second substrate and a second circuit board. The reception circuit unit is mounted on a third surface of the second circuit board. The second substrate is provided on a fourth surface side of the second circuit board. The reception antenna is mounted on a fourth surface of the second substrate, and is not provided in a corresponding range on a back surface side of the second substrate, the corresponding range on the back surface side of the second substrate corresponding to a range in which the second circuit board is disposed on the second substrate. The first surface and the third surface are front surfaces. The second surface and the fourth surface are back surfaces.

Advantageous Effects of Invention

The radar device according to the present invention provides the effect that the radar device can be mounted at any place on the automobile.

DESCRIPTION OF EMBODIMENTS

Hereinafter, a radar device according to embodiments of the present invention will be described with reference to the accompanying drawings. The present invention is not limited to the following embodiments. In the following description, physical connection and electrical connection are not distinguished from each other and are simply referred to as "connection". In the accompanying drawings, the scale of each member may be different from the actual one for easy understanding. Similarly, the scale of each member in some drawings may be different from that in other drawings.

First Embodiment

Figure 1:
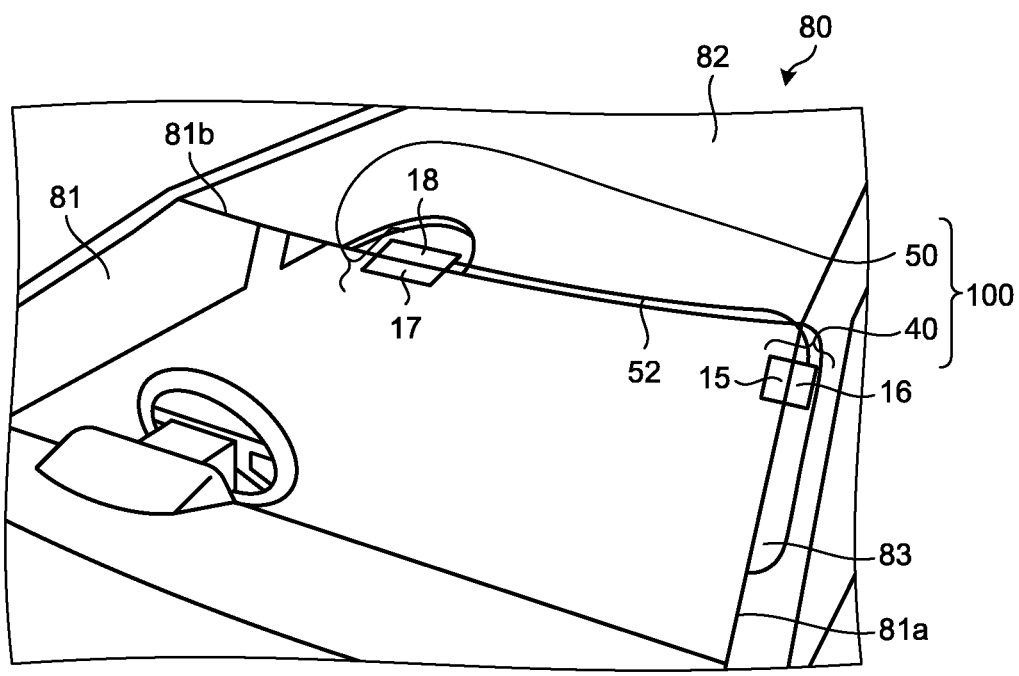
FIG. 1 is a diagram illustrating an example of a situation in which a radar device according to a first embodiment is disposed in an automobile.

FIG. 1 is a diagram illustrating an example of a situation in which a radar device 100 according to the first embodiment is disposed in an automobile 80. In FIG. 1, the radar device 100 includes a transmission module 40, a reception module 50, and a connection cable 52. The transmission module 40 generates a high frequency RAdio Detecting And Ranging (RADAR) signal. The reception module 50 receives, from a target object, reflected waves of the radar signal emitted into space.

The transmission module 40 includes a transmission antenna 15 and a transmission circuit unit 16. The reception module 50 includes a reception antenna 17 and a reception unit 18. As illustrated in FIG. 1, the transmission module 40 and the reception module 50, which provide different structures, are separately mounted on the automobile 80. Since the transmission module 40 and the reception module 50 are separately provided as the different structures, both the transmission module 40 and the reception module 50 can be downsized and thinned.

The connection cable 52 is a signal connection interface for transmitting signals between the transmission module 40 and the reception module 50. An example of the connection cable 52 is an electrical signal cable including a twisted pair or a coaxial line. Note that an optical signal cable may be used instead of the electrical signal cable. Instead of the physical connection cable 52, a technique of transmitting signals using Bluetooth (registered trademark) or a millimeter wave wireless LAN may be used.

The automobile 80 includes a windshield 81, a roof 82, and an A-pillar 83. The roof 82 and the A-pillar 83 are structures that support the automobile 80.

A typical car includes a plurality of pillars separated by windows on its side. The pillars are structures that connect the body and roof of the car, secure the interior space, and support the body. Typically, the pillars are designated alphabetically as the A, B, C, and D-pillars in order from front, but may be called differently depending on the type of car. Among these pillars, the illustrated A-pillar 83 is disposed on each side of the windshield 81. In this sense, the A-pillar is also called a "front pillar".

The windshield 81 includes four sides. Among the four sides, two sides not parallel to the ground that is a surface in contact with the tires (not illustrated) of the automobile 80 are defined as the first sides. Further, among the four sides, two sides parallel to the ground are defined as the second sides. The illustrated second side 81b is the upper one of the two second sides. The illustrated first side 81a is the right one of the two first sides, with the automobile 80 viewed from the front of the automobile 80. The second side 81b intersects the first side 81a. The term "intersect" means that the second side 81b and the first side 81a are not parallel.

On the windshield 81 of the automobile 80, the transmission antenna 15 is disposed along the first side 81a of the windshield 81 in the upper part of the first side 81a. The reception antenna 17 is disposed along the second side 81b of the windshield 81 in the middle of the second side 81b.

The transmission circuit unit 16 is disposed adjacent to the transmission antenna 15. The transmission antenna 15 is disposed on the windshield 81, but the transmission circuit unit 16 is accommodated in the A-pillar 83. Disposing the transmission circuit unit 16 and the transmission antenna 15 adjacent to each other is effective in reducing the loss of signal transmission between the transmission circuit unit 16 and the transmission antenna 15.

The reception unit 18 is disposed adjacent to the reception antenna 17. The reception antenna 17 is disposed on the windshield 81, but the reception unit 18 is accommodated in the roof 82. Disposing the reception unit 18 and the reception antenna 17 adjacent to each other is effective in reducing the loss of signal transmission between the reception unit 18 and the reception antenna 17.

In the exemplary configuration illustrated in FIG. 1, the transmission antenna 15 is disposed along the right one of the two first sides 81a of the windshield 81, and the transmission circuit unit 16 is disposed in the A-pillar 83 located on the right side. However, the present invention is not limited to this configuration. The transmission antenna 15 may be disposed along the left one of the two first sides 81a of the windshield 81, and the transmission circuit unit 16 may be disposed in the A-pillar 83 located on the left side, with the automobile 80 viewed from the front of the automobile 80.

In the example illustrated in FIG. 1, the transmission antenna 15 and the transmission circuit unit 16 are disposed in the upper part of the first side 81a. However, the present invention is not limited to this disposition. The transmission antenna 15 and the transmission circuit unit 16 may be disposed in the middle of the first side 81a or in the lower part of the first side 81a. Where the transmission antenna 15 and the transmission circuit unit 16 are to be disposed in the lower part of the first side 81a, it should be noted that such disposition ensures that the line of sight between the transmission antenna 15 and a target object is not blocked by a structure of the automobile 80.

In the example illustrated in FIG. 1, the reception antenna 17 and the reception unit 18 are disposed in the middle of the second side 81b. However, the present invention is not limited to this disposition. The reception antenna 17 and the reception unit 18 may be disposed in the right or left part of the second side 81b, with the automobile 80 viewed from the front of the automobile 80. In any case, it should be noted that the disposition ensures that the driver's view is not blocked by the reception antenna 17 exposed on the windshield 81.

Figure 2:
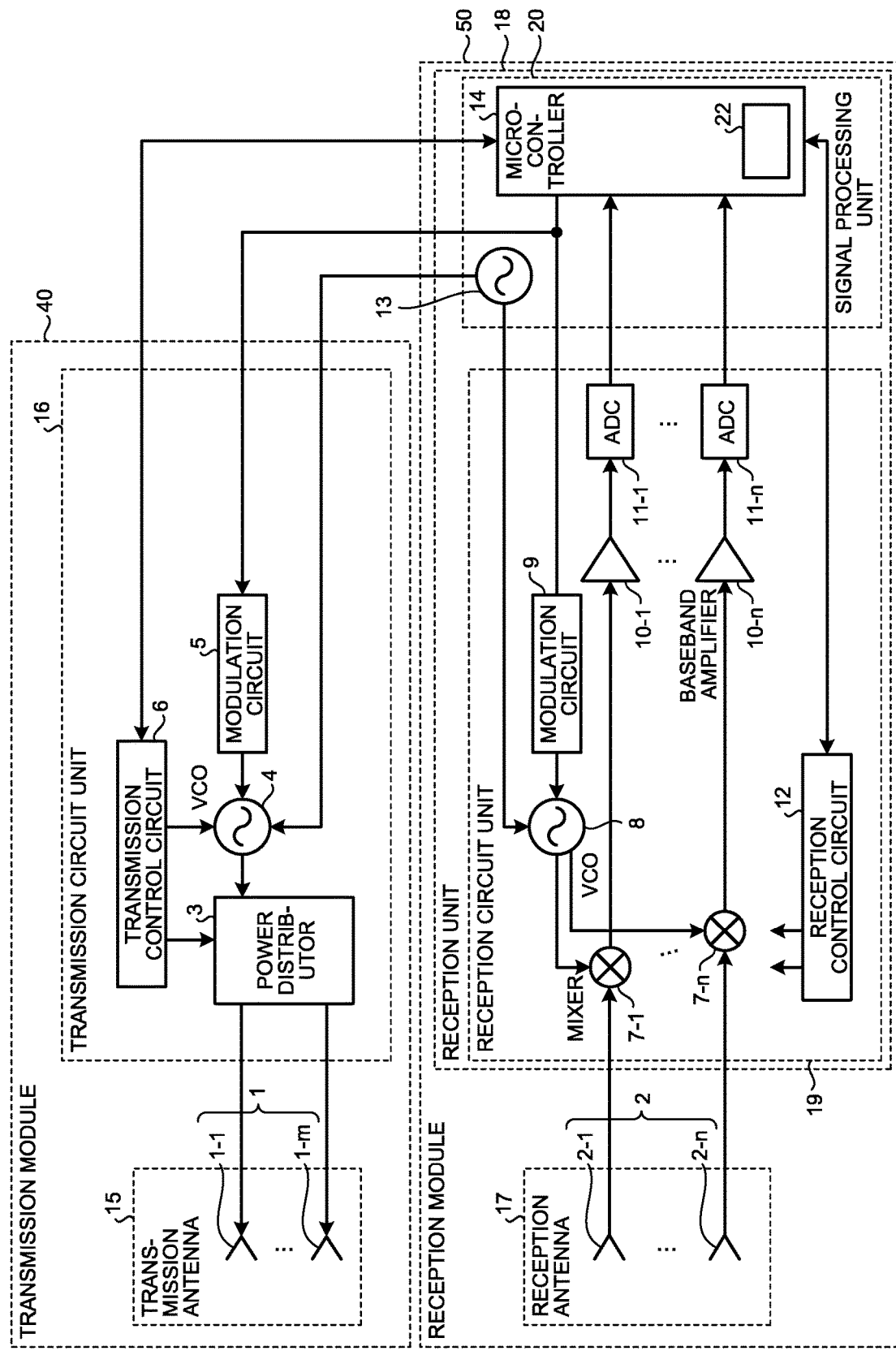
FIG. 2 is a block diagram illustrating a configuration of the radar device according to the first embodiment.

FIG. 2 is a block diagram illustrating a configuration of the radar device 100 according to the first embodiment. FIG. 2 depicts the configuration of a frequency modulated continuous wave (hereinafter abbreviated to "FM-CW") radar that uses FM-CW. The FM-CW radar has features: a simple configuration; and a relatively low baseband bandwidth, which facilitates signal processes.

As described above, the radar device 100 according to the first embodiment includes the transmission module 40 and the reception module 50. The transmission module 40 includes the transmission antenna 15 and the transmission circuit unit 16. The reception module 50 includes the reception antenna 17, a reception circuit unit 19, and a signal processing unit 20. The reception unit 18 includes the reception circuit unit 19 and the signal processing unit 20.

The transmission circuit unit 16 generates a radar signal. The transmission antenna 15 emits the radar signal into space as radio waves. The reception antenna 17 receives, from a target object, reflected waves of the radar signal emitted into space. The reception circuit unit 19 receives an output from the reception antenna 17. More specifically, the reception circuit unit 19 converts a signal in a radio frequency (hereinafter abbreviated to "RF") band output from the reception antenna 17 to a lower frequency signal. A signal in the RF band is called an RF signal. A low frequency signal is called a baseband signal. On the basis of the baseband signal, the signal processing unit 20 calculates target data, i.e. data on the target object. The target data include information on the distance to the target object, the velocity of the target object, and the orientation of the target object.

The transmission antenna 15 includes m transmitting element antennas 1-1 to 1-m. The transmitting element antennas 1-1 to 1-m are collectively referred to as the "transmitting element antenna 1". The reference character "m" is the number of channels for a transmission system. The transmission system is a control system including the transmission antenna 15 and the transmission circuit unit 16. It is noted that m is an integer of two or more.

The reception antenna 17 includes n receiving element antennas 2-1 to 2-n. The receiving element antennas 2-1 to 2-n are collectively referred to as the "receiving element antenna 2". The reference character "n" is the number of channels for a reception system. The reception system is a control system including the reception antenna 17 and the reception circuit unit 19. It is noted that n is an integer of two or more.

Each of the transmission system and the reception system performs signal processing on a per channel basis. Channels can be defined independently for each of the transmission system and the reception system. Hereinafter, channels for the transmission system are referred to as "transmission channels", and channels for the reception system are referred to as "reception channels". The number of transmission channels m and the number of reception channels n may be the same or different. The concept of transmission channels and reception channels will be described later.

The transmission circuit unit 16 includes a power distributor 3, a voltage control oscillator (hereinafter referred to as "VCO") 4, a modulation circuit 5, and a transmission control circuit 6. Each element of the transmission circuit unit 16 is made up of a monolithic microwave integrated circuit (hereinafter referred to as "MMIC").

The transmission control circuit 6 applies a control voltage for operating the power distributor 3, the VCO 4, and the modulation circuit 5. The transmission control circuit 6 also receives a command signal from a microcontroller 14 described later. The transmission control circuit 6 generates a control signal for controlling the operation of the power distributor 3 and the VCO 4 in accordance with the command signal.

The modulation circuit 5 receives, from the microcontroller 14, modulation parameters including the frequency modulation width and the modulation period. The modulation circuit 5 generates a modulation signal in accordance with the modulation parameters. The modulation circuit 5 includes a phase locked loop (hereinafter abbreviated to "PLL") circuit for stabilizing the modulation signal through phase synchronization when generating the modulation signal.

A reference signal generated by a reference oscillator 13 described later and the modulation signal generated by the modulation circuit 5 are input to the VCO 4. The VCO 4 generates an FM-CW signal on the basis of the reference signal and the modulation signal and outputs the FM-CW signal to the power distributor 3. The FM-CW signal is a radar signal in the FM-CW radar.

The FM-CW signal includes an up-chirp signal in which the transmission frequency changes from low to high and a down-chirp signal in which the transmission frequency changes from high to low. The power distributor 3 distributes power to the transmitting element antennas 1-1 to 1-m. The distribution of power is performed by controlling the amplitude and phase for exciting the transmitting element antennas 1-1 to 1-m.

The reception unit 18 includes the reception circuit unit 19 and the signal processing unit 20. The reception circuit unit 19 includes mixers 7-1 to 7-n, a VCO 8, a modulation circuit 9, baseband amplifiers 10-1 to 10-n, analog-to-digital converters (hereinafter abbreviated to "ADCs") 11-1 to 11-n, and a reception control circuit 12. Each element of the reception circuit unit 19 is made up of an MMIC. The signal processing unit 20 includes the reference oscillator 13 and the microcontroller 14 described above.

The modulation parameters are transmitted from the microcontroller 14 are also transmitted to the modulation circuit 9 as well as to the modulation circuit 5 of the transmission circuit unit 16. The modulation circuit 9 generates a modulation signal in accordance with the modulation parameters. The modulation circuit 9 includes a PLL circuit for stabilizing the modulation signal through phase synchronization when generating the modulation signal.

The reference signal generated by the reference oscillator 13 and the modulation signal generated by the modulation circuit 9 are input to the VCO 8. On the basis of the reference signal and the modulation signal, the VCO 8 generates a local signal that is applied to each of the mixers 7-1 to 7-n.

Each of reception signals received by the receiving element antennas 2-1 to 2-n is input to a corresponding one of the mixers 7-1 to 7-n. The mixers 7-1 to 7-n use the local signals generated by the VCO 8 to down-convert the reception signals to baseband signals.

Each of the baseband signals to which the respective mixers 7-1 to 7-n have down-converted the local signals is amplified by a corresponding one of the baseband amplifiers 10-1 to 10-n. Outputs from the baseband amplifiers 10-1 to 10-n are analog signals. Each of the ADCs 11-1 to 11-n converts the output from a corresponding one of the baseband amplifiers 10-1 to 10-n to a digital signal.

The reception control circuit 12 applies a control voltage for operating the mixers 7-1 to 7-n, the VCO 8, the modulation circuit 9, the baseband amplifiers 10-1 to 10-n, and the ADCs 11-1 to 11-n.

The signal processing unit 20 includes the reference oscillator 13 and the microcontroller 14. The microcontroller 14 is an example of a computing unit for performing various computations. Instead of the microcontroller 14, a microprocessor, a microcomputer, a central processing unit (CPU), or a digital signal processor (DSP) may be used. Alternatively, instead of the microcontroller 14, a single circuit, a composite circuit, a programmed processor, a parallel programmed processor, an application specific integrated circuit (ASIC), a field-programmable gate array (FPGA), or a processing circuit including a combination thereof may be used.

The microcontroller 14 includes a non-volatile memory 22. The non-volatile memory 22 stores the modulation parameters described above. The microcontroller 14 performs computation processes for calculating target data. The MMICs in the transmission circuit unit 16 and the MMICs in the reception circuit unit 19 vary depending on the production lot. For this reason, it is preferable to store, in the non-volatile memory 22, the correction amount or correction coefficient individually adjusted and determined for each product of the transmission module 40 and the reception module 50. The values of the modulation parameters described above are corrected by the correction amount or correction coefficient. The transmission control circuit 6 and the reception control circuit 12 control the control target components, using the corrected modulation parameters.

Figure 3:
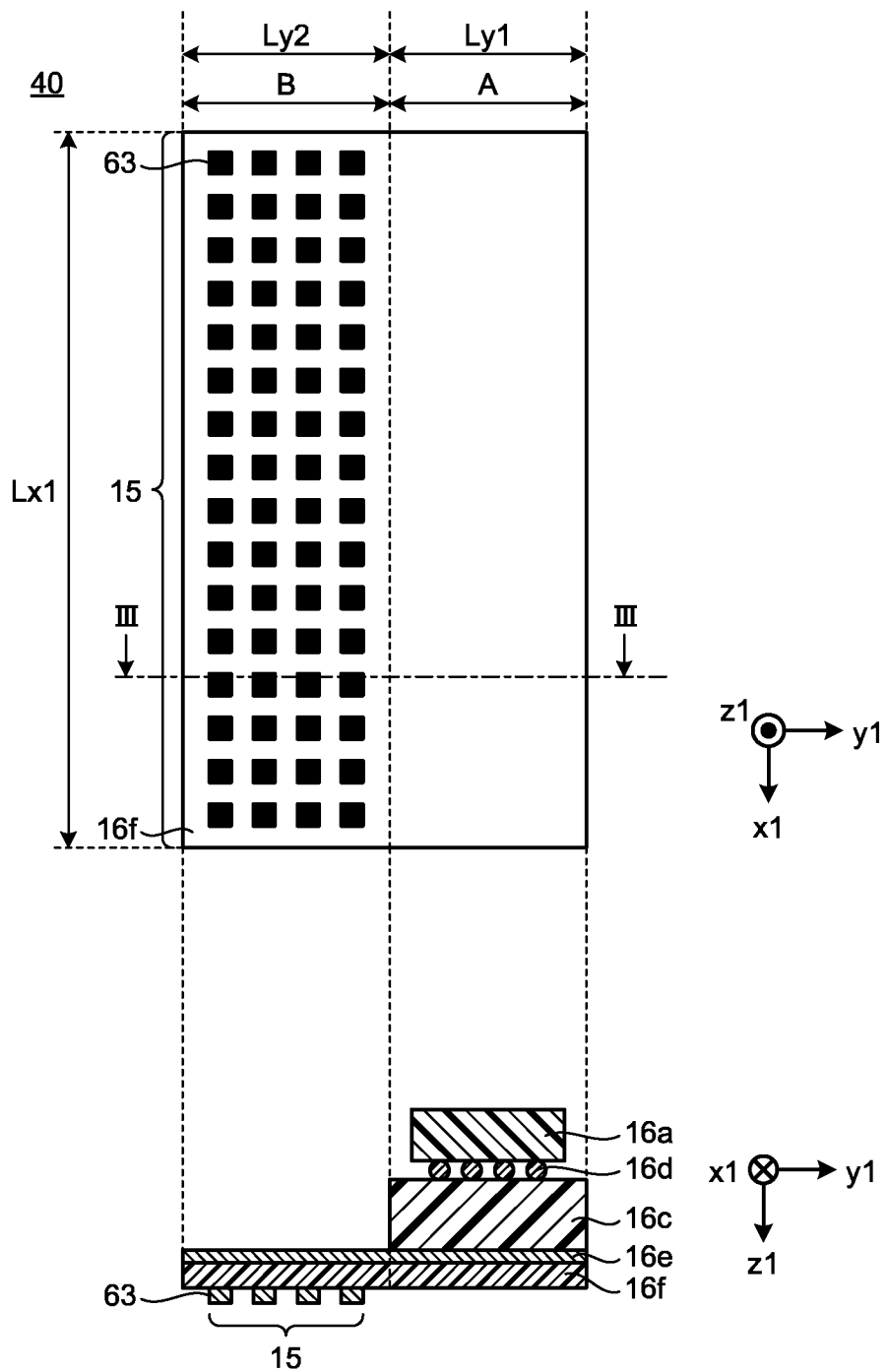
FIG. 3 is a front view and a cross-sectional view illustrating a transmission module in the first embodiment.
Figure 4:
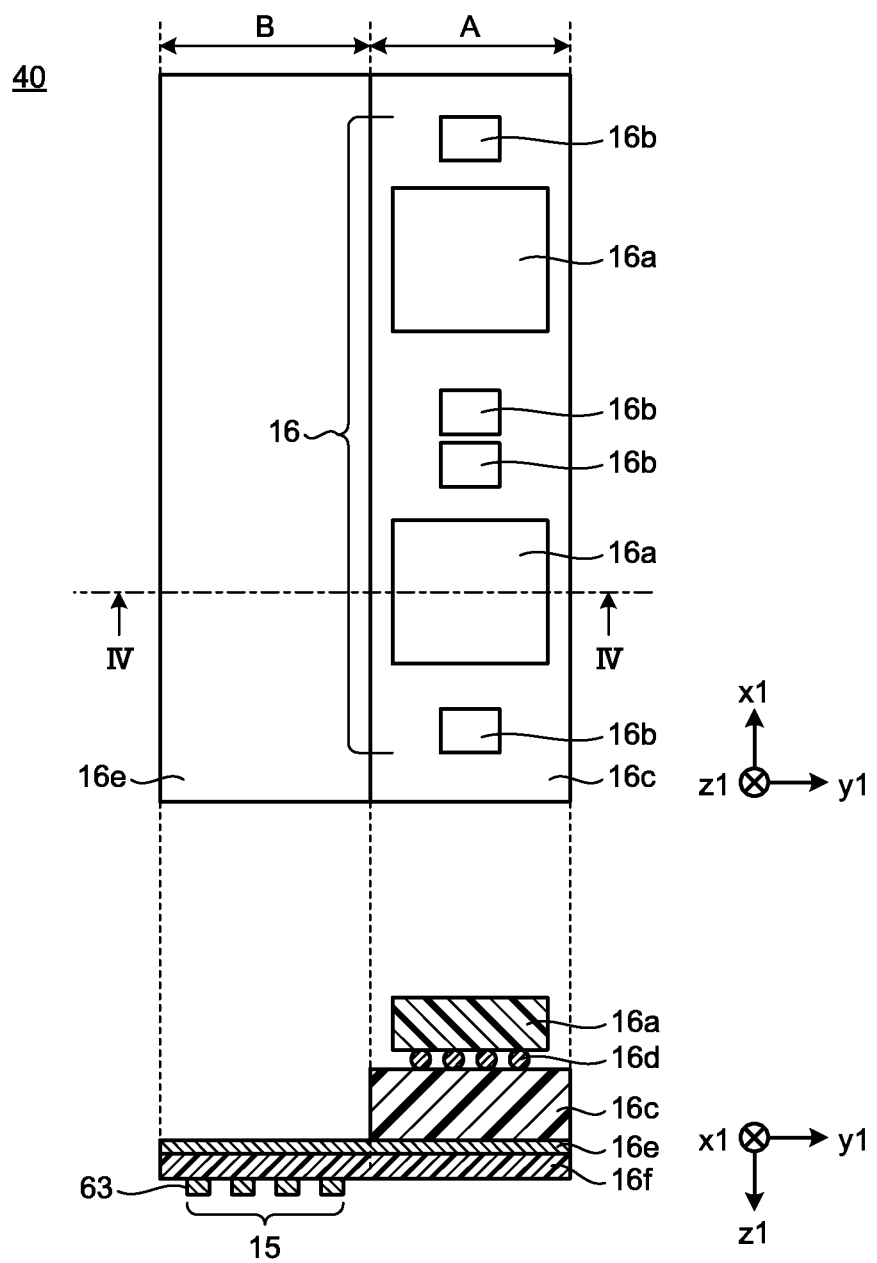
FIG. 4 is a rear view and a cross-sectional view illustrating the transmission module in the first embodiment.

Next, the configuration of the transmission module 40 in the first embodiment will be described with reference to FIGS. 3 and 4. FIG. 3 is a front view and a cross-sectional view illustrating the transmission module 40 in the first embodiment. In FIG. 3, the front view of the transmission module 40 is provided on the upper side, and the cross-sectional view taken along line of the upper view and seen in the direction of the arrows is provided on the lower side. FIG. 4 is a rear view and a cross-sectional view illustrating the transmission module 40 in the first embodiment. In FIG. 4, the rear view of the transmission module 40 is provided on the upper side, and the cross-sectional view taken along line IV-IV of the upper view and seen in the direction of the arrows is provided on the lower side. In the following description, right-handed orthogonal coordinate axes are used. That is, the first direction x1 and the second direction y1 are orthogonal to each other, and the third direction z1 is orthogonal to both the first direction x1 and the second direction y1 in a right-handed system.

The transmission module 40 includes a circuit board 16c, a ground conductor 16e, and an antenna substrate 16f in addition to the transmission antenna 15 and the transmission circuit unit 16 described above. The transmission circuit unit 16 includes transmission circuit unit integrated circuits (ICs) 16a and peripheral electronic components 16b.

The power distributor 3, the VCO 4, the modulation circuit 5, and the transmission control circuit 6 described above are mounted on the transmission circuit unit ICs 16a. The peripheral electronic components 16b are electronic components other than the components mounted on the transmission circuit unit ICs 16a. The transmission circuit unit ICs 16a are mounted on the circuit board 16c via solder balls 16d. The circuit board 16c is a resin board. Note that the circuit board 16c may be referred to as the "first circuit board".

The circuit board 16c has a planar shape. The planar shape of the circuit board 16c is a rectangle in which the length Lx1 in the first direction x1 is larger than the length Ly1 in the second direction y1. The length Lx1 is in the range of several tens of millimeters to several hundreds of millimeters. The length Ly1 is in the range of several millimeters to several tens of millimeters.

The transmission circuit unit ICs 16a and the peripheral electronic components 16b are disposed on one of the two surfaces of the circuit board 16c. In FIGS. 3 and 4, the one surface is located on the rear surface side of the transmission module 40. A normal to the rear surface faces the interior of the automobile 80, in other words, is directed to the inside of the automobile 80. The ground conductor 16e is provided on the other of the two surfaces of the circuit board 16c. In FIGS. 3 and 4, the other surface is located on the front surface side of the transmission module 40. A normal to the front surface is directed to the outside of the automobile 80. Each of the circuit board 16c, the ground conductor 16e, and the antenna substrate 16f has a surface located on the rear surface side of the transmission module 40 and hereinafter referred to as the "first surface". Each of the circuit board 16c, the ground conductor 16e, and the antenna substrate 16f has a surface located on the front surface side of the transmission module 40 and hereinafter referred to as the "second surface". A normal to the first surfaces extends in the negative third direction z1. A normal to the second surfaces extends in the positive third direction z1. The first surface is to the second surface what the "front surface" is to the "back surface".

The ground conductor 16e has a planar shape. The planar shape of the ground conductor 16e is a rectangle in which the length Lx1 in the first direction x1 is larger than the length Ly1+Ly2 in the second direction y1. The length Ly2 is in the range of several millimeters to several tens of millimeters.

The antenna substrate 16f is provided on the second surface side of the ground conductor 16e. In other words, the ground conductor 16e is provided on the first surface side of the antenna substrate 16f. The antenna substrate 16f is a resin substrate. Note that the antenna substrate 16f may be referred to as the "first substrate".

The antenna substrate 16f has a planar shape. The planar shape of the antenna substrate 16f is a rectangle in which the length Lx1 in the first direction x1 is larger than the length Ly1+Ly2 in the second direction y1. In FIGS. 3 and 4, the antenna substrate 16f has the same shape as the ground conductor 16e, but may be smaller or larger than the ground conductor 16e.

The transmission antenna 15 is disposed on the second surface side of the antenna substrate 16f. The transmission antenna 15 includes sixty four antenna elements 63. An example of each antenna element 63 is a patch antenna. The sixty four antenna elements 63 are disposed in sixteen rows along the first direction x1 and in four rows along the second direction y1 on the second surface of the antenna substrate 16f. Note that the number of antenna elements 63 and the number of arrays along the first direction x1 and the second direction y1 are only examples. The number of elements and the number of arrays can be determined on the basis of: the directivity of the transmission antenna 15 in a plane including the first direction x1 and the third direction z1; and the directivity of the transmission antenna 15 in a plane including the second direction y1 and the third direction z1.

In the configuration of the transmission module 40 illustrated in FIGS. 3 and 4, the portion indicated by the range "A" is accommodated in the A-pillar 83, and the portion indicated by the range "B" is exposed to the windshield 81. The range "A" and the range "B" do not overlap. In other words, the sixty four antenna elements 63 are not disposed in a corresponding range on the back surface side of the antenna substrate 16f, which corresponding range corresponds to the range "A" in which the circuit board 16c is disposed. This configuration provides the reduced portion of the transmission module 40 exposed to the windshield 81, thereby preventing the transmission module 40 mounted on the windshield 81 from obstructing the view from the driver's seat. In addition, the transmission circuit unit 16 thicker in the third direction z1 than the transmission antenna 15 can be accommodated in the A-pillar 83. This can improve the mountability of the radar device 100 on the automobile 80. This can also improve the workability in mounting the radar device 100 on the automobile 80.

In the configuration of the transmission module 40 illustrated in FIGS. 3 and 4, the ground conductor 16e is provided. The presence of the ground conductor 16e facilitates designing the transmission antenna 15. However, in the configuration of the transmission module 40 illustrated in FIGS. 3 and 4, the ground conductor 16e may not be provided. The absence of the ground conductor 16e simplifies the configuration of the transmission module 40.

The antenna substrate 16f may be configured using a transparent substrate. In a case where the antenna substrate 16f is a transparent substrate and the ground conductor 16e is not provided, each of the plurality of antenna elements 63 may be disposed on the first surface side of the antenna substrate 16f. Since the transparent substrate has high radio wave permeability, the antenna elements 63 can be disposed on the first surface side of the antenna substrate 16$f$.

In the case of the configuration in which the antenna elements 63 are disposed on the first surface side of the antenna substrate 16$f$, no protrusion is present on the second surface side of the antenna substrate 16$f$. Therefore, the second surface of the antenna substrate 16$f$ can be formed conforming to the curvature of the windshield 81. This can improve the workability in mounting the transmission antenna 15 on the automobile 80.

Figure 5:
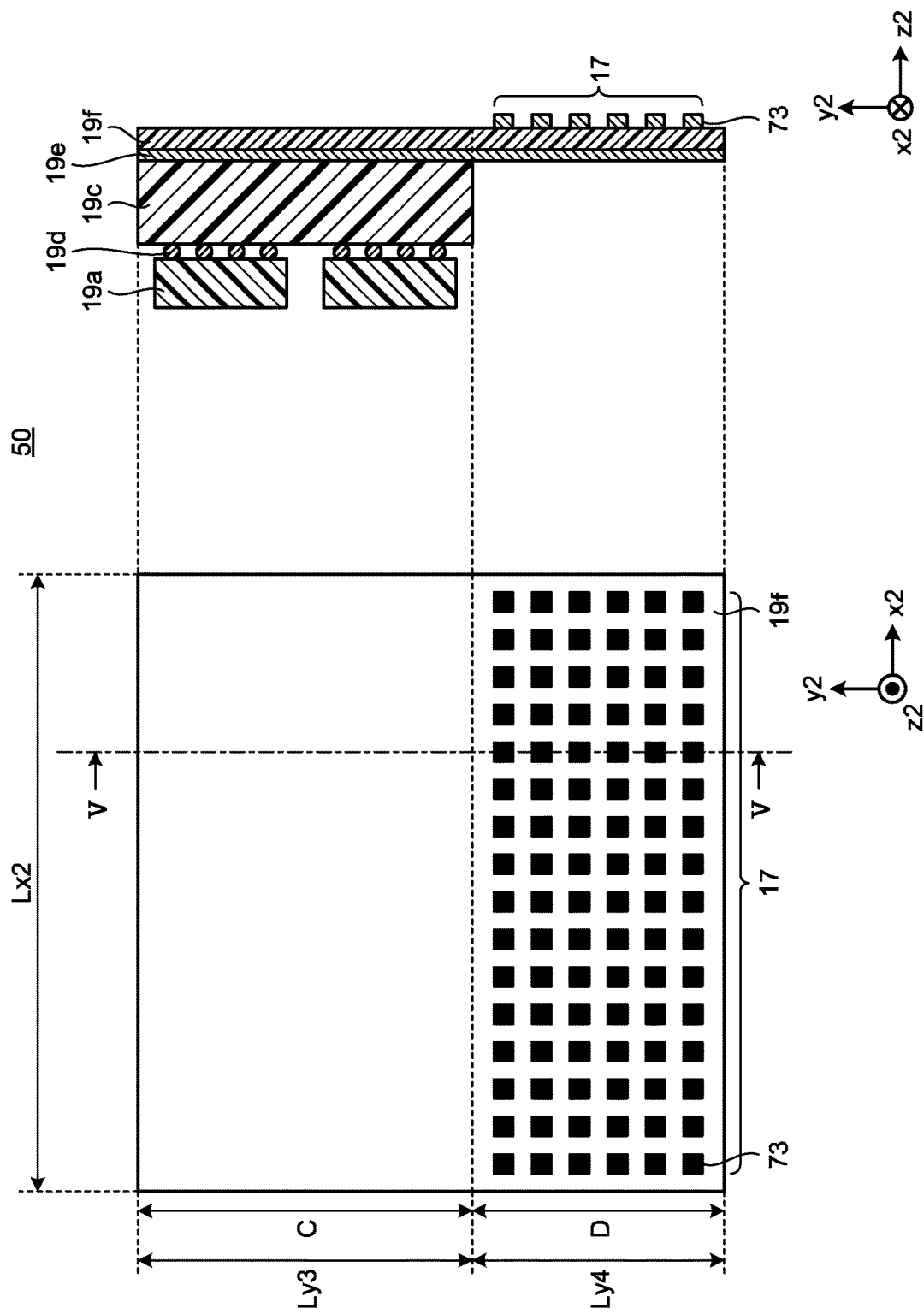
FIG. 5 is a front view and a cross-sectional view illustrating a reception module in the first embodiment.
Figure 6:
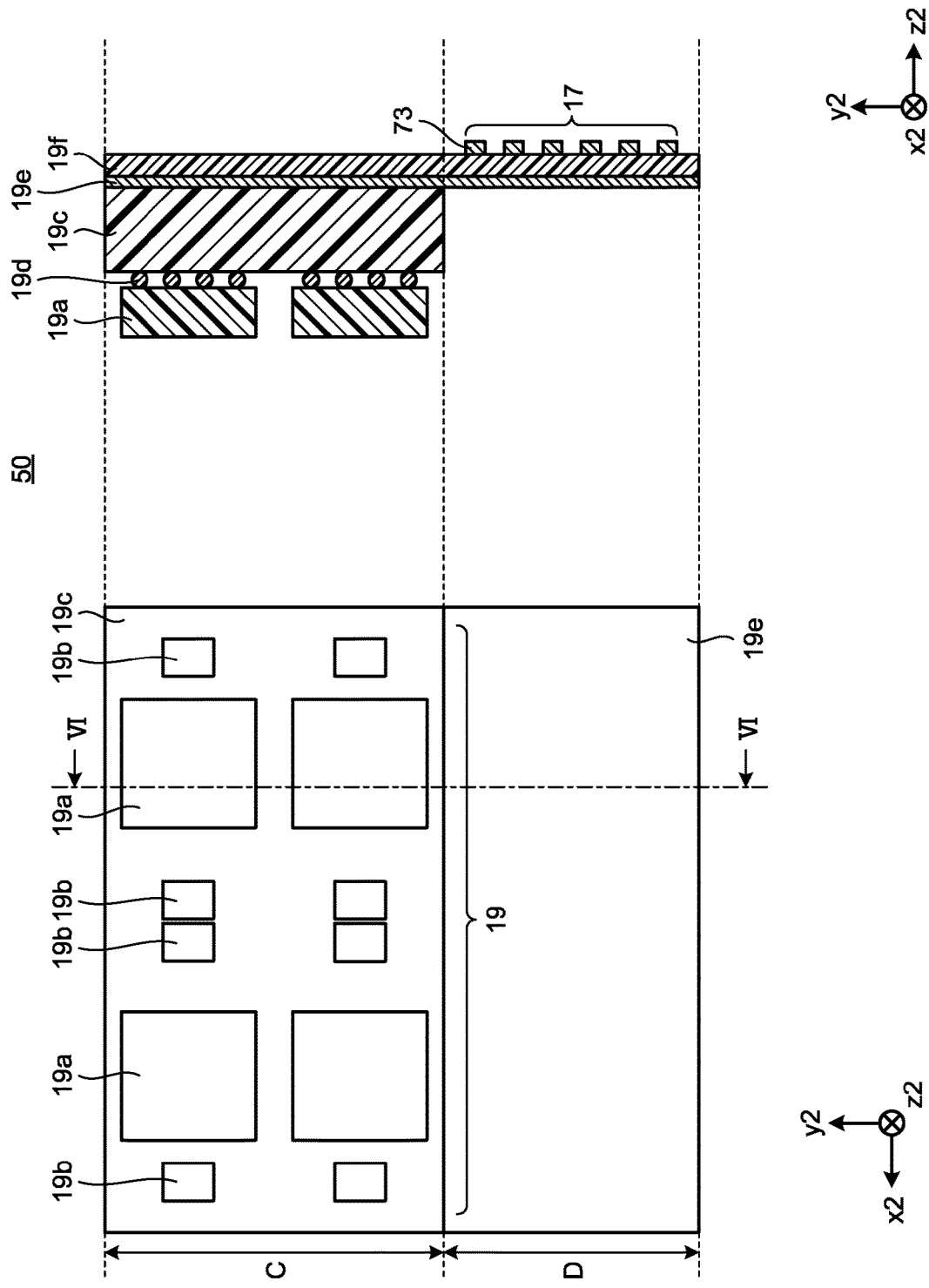
FIG. 6 is a rear view and a cross-sectional view illustrating the reception module in the first embodiment.

Next, the configuration of the reception module 50 in the first embodiment will be described with reference to FIGS. 5 and 6. FIG. 5 is a front view and a cross-sectional view illustrating the reception module 50 in the first embodiment. In FIG. 5, the front view of the reception module 50 is provided on the left side, and the cross-sectional view taken along line V-V of the left view and seen in the direction of the arrows is provided on the right side. FIG. 6 is a rear view and a cross-sectional view illustrating the reception module 50 in the first embodiment. In FIG. 6, the rear view of the reception module 50 is provided on the left side, and the cross-sectional view taken along line VI-VI of the left view and seen in the direction of the arrows is provided on the right side. In the following description, right-handed orthogonal coordinate axes are used. That is, the fourth direction $x2$ and the fifth direction $y2$ are orthogonal to each other, and the sixth direction $z2$ is orthogonal to both the fourth direction $x2$ and the fifth direction $y2$ in a right-handed system.

The reception module 50 includes a circuit board 19$c$, a ground conductor 19$e$, and an antenna substrate 19$f$ in addition to the reception antenna 17 and the reception circuit unit 19 described above. The reception circuit unit 19 includes reception circuit unit ICs 19$a$ and peripheral electronic components 19$b$.

The mixers 7-1 to 7-$n$, the VCO 8, the modulation circuit 9, the baseband amplifiers 10-1 to 10-$n$, and the ADCs 11-1 to 11-$n$ described above are mounted on the reception circuit unit ICs 19$a$. The peripheral electronic components 19$b$ are electronic components other than the components mounted on the reception circuit unit ICs 19$a$. The reception circuit unit ICs 19$a$ are mounted on the circuit board 19$c$ via solder balls 19$d$. The circuit board 19$c$ is a resin board. Note that the circuit board 19$c$ may be referred to as the "second circuit board".

The circuit board 19$c$ has a planar shape. The planar shape of the circuit board 19$c$ is a rectangle in which the length $Lx2$ in the fourth direction $x2$ is larger than the length $Ly3$ in the fifth direction $y2$. The length $Lx2$ is in the range of several tens of millimeters to several hundreds of millimeters. The length $Ly3$ is in the range of several millimeters to several tens of millimeters.

The reception circuit unit ICs 19$a$ and the peripheral electronic components 19$b$ are disposed on one of the two surfaces of the circuit board 19$c$. In FIGS. 5 and 6, the one surface is located on the rear surface side of the reception module 50. A normal to the rear surface faces the interior of the automobile 80, in other words, is directed to the inside of the automobile 80. The ground conductor 19$e$ is provided on the other of the two surfaces of the circuit board 19$c$. In FIGS. 5 and 6, the other surface is located on the front surface side of the reception module 50. A normal to the front surface is directed to the outside of the automobile 80. Each of the circuit board 19$c$, the ground conductor 19$e$, and the antenna substrate 19$f$ has a surface located on the rear surface side of the reception module 50, and hereinafter referred to as the "third surface". Each of the circuit board 19$c$, the ground conductor 19$e$, and the antenna substrate 19$f$ has a surface located on the front surface side of the reception module 50, and hereinafter referred to as the "fourth surface". A normal to the third surfaces extends in the negative sixth direction $z2$. A normal to the fourth surfaces extends in the positive sixth direction $z2$. The third surface is to the fourth surface what the "front surface" is to the "back surface".

The ground conductor 19$e$ has a planar shape. The planar shape of the ground conductor 19$e$ is a rectangle in which the length $Lx2$ in the fourth direction $x2$ is larger than the length $Ly3+Ly4$ in the fifth direction $y2$. The length $Ly4$ is in the range of several millimeters to several tens of millimeters.

The antenna substrate 19$f$ is provided on the fourth surface side of the ground conductor 19$e$. In other words, the ground conductor 19$e$ is provided on the third surface side of the antenna substrate 19$f$. The antenna substrate 19$f$ is a resin substrate. Note that the antenna substrate 19$f$ may be referred to as the "second substrate".

The antenna substrate 19$f$ has a planar shape. The planar shape of the antenna substrate 19$f$ is a rectangle in which the length $Lx2$ in the fourth direction $x2$ is larger than the length $Ly3+Ly4$ in the fifth direction $y2$. In FIGS. 5 and 6, the antenna substrate 19$f$ has the same shape as the ground conductor 19$e$, but may be smaller or larger than the ground conductor 19$e$.

The reception antenna 17 is disposed on the fourth surface side of the antenna substrate 19$f$. The reception antenna 17 includes ninety six antenna elements 73. An example of each antenna element 73 is a patch antenna. The ninety six antenna elements 73 are disposed in sixteen rows along the fourth direction $x2$ and in six rows along the fifth direction $y2$ on the fourth surface of the antenna substrate 19$f$. The number of antenna elements 73 and the number of arrays along the fourth direction $x2$ and the fifth direction $y2$ are only examples. The number of elements and the number of arrays can be determined on the basis of: the directivity of the reception antenna 17 in a plane including the fourth direction $x2$ and the sixth direction $z2$; and the directivity of the reception antenna 17 in a plane including the fifth direction $y2$ and the sixth direction $z2$.

In the configuration of the reception module illustrated in FIGS. 5 and 6, the portion indicated by the range "C" is accommodated in the roof 82, and the portion indicated by the range "D" is exposed to the windshield 81. The range "C" and the range "D" do not overlap. In other words, the ninety six antenna elements 73 are not disposed in a corresponding range on the back surface side of the antenna substrate 19$f$, which corresponding range corresponds to the range "C" in which the circuit board 19$c$ is disposed. This configuration provides the reduced portion of the reception module 50 exposed to the windshield 81, thereby preventing the reception module 50 mounted on the windshield 81 from obstructing the view from the driver's seat. In addition, the reception circuit unit 19 thicker in the sixth direction $z2$ than the reception antenna 17 can be accommodated in the roof 82. This can improve the mountability of the radar device 100 on the automobile 80. This can also improves the workability in mounting the radar device 100 on the automobile 80.

In the configuration of the reception module illustrated in FIGS. 5 and 6, the ground conductor 19$e$ is provided. The presence of the ground conductor 19$e$ facilitates designing the reception antenna 17. However, in the configuration of the reception module illustrated in FIGS. 5 and 6, the ground conductor 19e may not be provided. The absence of the ground conductor 19e simplifies the configuration of the reception module 50.

The antenna substrate 19f may be configured using a transparent substrate. In a case where the antenna substrate 19f is a transparent substrate and the ground conductor 19e is not provided, each of the plurality of antenna elements 73 may be disposed on the third surface side of the antenna substrate 19f. Since the transparent substrate has high radio wave permeability, the antenna elements 73 can be disposed on the third surface side of the antenna substrate 19f.

In the case of the configuration in which the antenna elements 73 are disposed on the third surface side of the antenna substrate 19f, no protrusion is present on the fourth surface side of the antenna substrate 19f. Therefore, the fourth surface of the antenna substrate 19f can be formed conforming to the curvature of the windshield 81. This can facilitate improve the workability in mounting the reception antenna 17 on the automobile 80.

Figure 7:
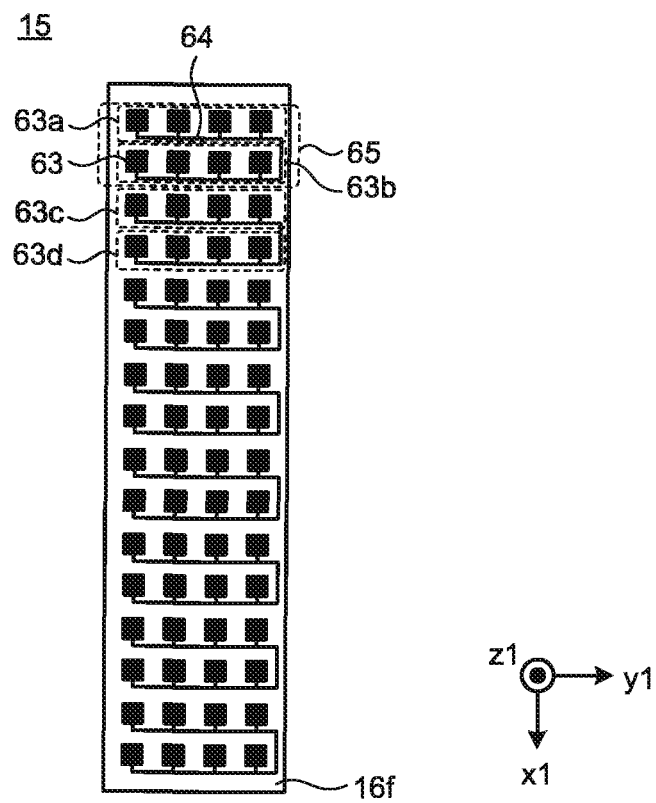
FIG. 7 is a diagram for explaining the concept of transmission channels in the first embodiment.
Figure 8:
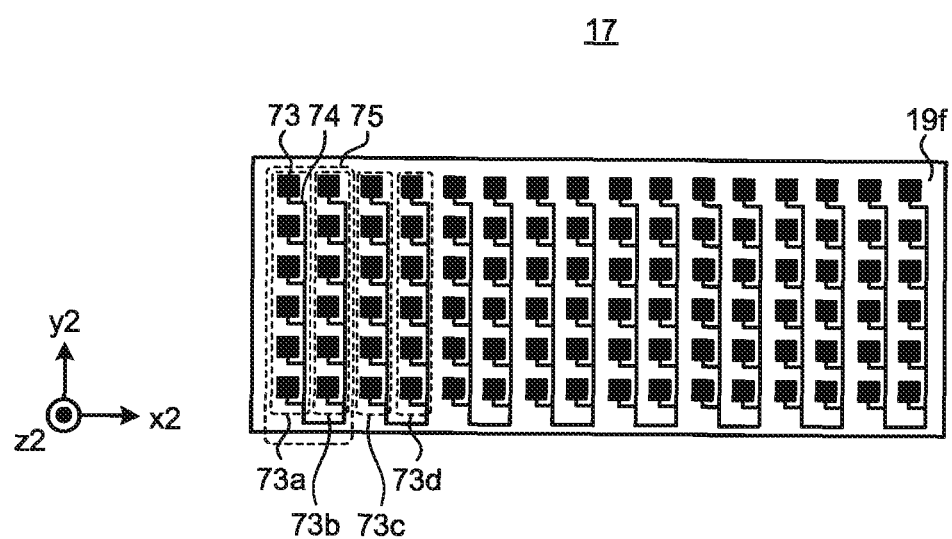
FIG. 8 is a diagram for explaining the concept of reception channels in the first embodiment.

Next, the concept of transmission channels and reception channels in the first embodiment will be described with reference to FIGS. 7 and 8. FIG. 7 is a diagram for explaining the concept of transmission channels in the first embodiment. FIG. 7 depicts the transmission antenna 15 extracted from the transmission module 40 illustrated in FIG. 3. FIG. 8 is a diagram for explaining the concept of reception channels in the first embodiment. FIG. 8 depicts the reception antenna 17 extracted from the reception module 50 illustrated in FIG. 5.

In FIG. 7, a first transmission antenna element group 63a made up of four antenna elements 63 aligned in the second direction y1 and a second transmission antenna element group 63b made up of four antenna elements 63 aligned in the second direction y1 are connected to each other by a line 64. An example of the line 64 is a microstrip line. The transmission antenna element group including the eight antenna elements 63 surrounded by a broken line 65 define one transmission channel. FIG. 7 illustrates a configuration including eight transmission channels. That is, the number of transmission channels m is eight in this example.

In the example of FIG. 7, the first transmission antenna element group 63a and the second transmission antenna element group 63b are adjacent to each other. However, it is not required that the first transmission antenna element group 63a and the second transmission antenna element group 63b be adjacent to each other. FIG. 7 also illustrates a third transmission antenna element group 63c and a fourth transmission antenna element group 63d. The first transmission antenna element group 63a and the third transmission antenna element group 63c may define the first transmission channel, and the second transmission antenna element group 63b and the fourth transmission antenna element group 63d may define the second transmission channel. Alternatively, the first transmission antenna element group 63a, the second transmission antenna element group 63b, and the third transmission antenna element group 63c may define the first transmission channel, and the second transmission antenna element group 63b, the third transmission antenna element group 63c, and the fourth transmission antenna element group 63d may define the second transmission channel.

In FIG. 8, a first reception antenna element group 73a made up of six antenna elements 73 aligned in the fifth direction y2 and a second reception antenna element group 73b made up of six antenna elements 73 aligned in the fifth direction y2 are connected to each other by a line 74. An example of the line 74 is a microstrip line. The reception antenna element group including the 12 antenna elements 73 surrounded by a broken line 75 defines one reception channel. FIG. 8 is a configuration including 12 reception channels. That is, the number of reception channels n is 12 in this example.

In the example of FIG. 8, the first reception antenna element group 73a and the second reception antenna element group 73b are adjacent to each other. However, it is not required that the first reception antenna element group 73a and the second reception antenna element group 73b be adjacent to each other. FIG. 8 also illustrates a third reception antenna element group 73c and a fourth reception antenna element group 73d. The first reception antenna element group 73a and the third reception antenna element group 73c may define the first reception channel, and the second reception antenna element group 73b and the fourth reception antenna element group 73d may define the second reception channel. Alternatively, the first reception antenna element group 73a, the second reception antenna element group 73b, and the third reception antenna element group 73c may define the first reception channel, and the second reception antenna element group 73b, the third reception antenna element group 73c, and the fourth reception antenna element group 73d may define the second reception channel.

Figure 9:
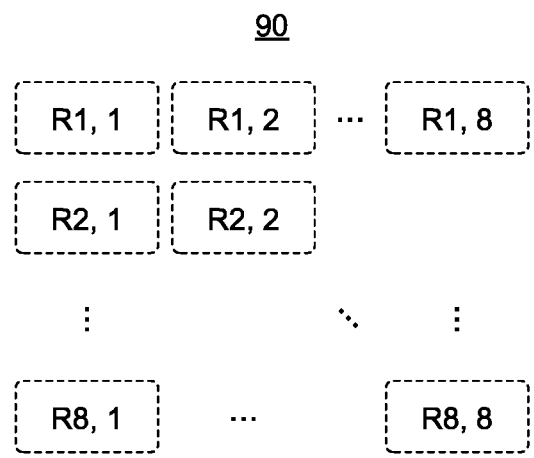
FIG. 9 is a diagram for explaining the concept of a virtual two-dimensional planar antenna in the first embodiment.

FIG. 9 is a diagram for explaining the concept of a virtual two-dimensional planar antenna 90 in the first embodiment. The virtual two-dimensional planar antenna can be implemented by utilizing the concept of transmission channels and reception channels.

Assume that a plane parallel to the ground, i.e. a surface contacting the tires (not illustrated) of the automobile 80 is referred to as the horizontal plane. Among the planes orthogonal to the horizontal plane, the plane including the traveling direction of the automobile 80 that travels in a straight line is referred to as the vertical plane. As mentioned above, the transmission antenna 15 includes a plurality of transmission channels. In the transmission antenna 15, power is supplied to each of the plurality of transmission channels. If power is supplied using different excitation phases for the plurality of transmission channels, beam scanning in the vertical plane can be performed at the transmission antenna 15.

As mentioned above, the reception antenna 17 includes a plurality of reception channels. If reception is performed at each of the plurality of reception channels, beam scanning in the horizontal plane can be performed at the reception antenna 17.

Therefore, the radar device 100 according to the first embodiment can control directivity in both the vertical plane and the horizontal plane by performing beam scanning in the vertical plane using the transmission antenna 15 and by performing beam scanning in the horizontal plane using the reception antenna 17.

The directivity of the transmission antenna 15 may be controlled by causing the plurality of transmission channels of the transmission antenna 15 to emit radio waves with different phases. The emission of radio waves from the plurality of transmission channels of the transmission antenna 15 may be performed using time division, in which case, after radio waves are received by the reception antenna 17, a plurality of digital signals corresponding to the received radio waves can be reconstructed. Each of the plurality of transmission channels of the transmission antenna 15 may emit radio waves having different codes, in which case, after radio waves are received by the reception antenna 17, signals corresponding to the respective channels can be separated on the basis of the codes.

Since the positions of the plurality of transmission channels of the transmission antenna 15 are different from one another, the transmission antenna 15 emits radio waves with different phases in different directions. Therefore, the phase of the signal corresponding to each of the radio waves received by the reception antenna 17 varies depending on the transmission channel of the transmission antenna 15. That is, from the radio waves received by the reception antenna 17, signals equivalent to signals that are received by the virtual two-dimensional planar antenna 90 illustrated in FIG. 9 are obtained.

In FIG. 9, each part surrounded by a broken line represents a virtual transmission/reception channel. Each transmission/reception channel is assigned a label "Rp, q" using a natural number p and a natural number q. The natural number p of the label "Rp, q" indicates the identification number of the transmission channel, and the natural number q of the label "Rp, q" indicates the identification number of the reception channel.

In FIG. 9, the virtual reception antenna in the first row and the first column represents the antenna in a case where a signal from the first transmission channel of the transmission antenna 15 is received at the first reception channel of the reception antenna 17. The virtual reception antenna in the second row and the second column represents the antenna in a case where a signal from the second transmission channel of the transmission antenna 15 is received at the second reception channel of the reception antenna 17. The same applies to the others. The angle of a reflected wave is estimated by multiplying the signal corresponding to the virtual two-dimensional planar antenna of FIG. 9 by the phase for forming a beam in an arbitrary direction. Since the transmission antenna element groups defining the transmission channels and the reception antenna element groups defining the reception channels are disposed virtually and two-dimensionally, beams can be formed not only in the horizontal and vertical planes but also in oblique directions.

As described above, the radar device 100 according to the first embodiment includes the transmission antenna and the transmission circuit unit disposed along the first side of the windshield of the automobile and the reception antenna and the reception unit disposed along the second side of the windshield of the automobile. The first side is one of the two sides among the four sides of the windshield, which two sides are not parallel to the ground. The second side is the upper one of the two sides among the four sides of the windshield, which two sides are parallel to the ground. The transmission antenna and the reception antenna are exposed on the windshield. The transmission circuit unit and the reception unit are accommodated in the structures that support the automobile. The windshield has a larger area than the front grille and the bumper, thus enabling flexible dispositions. Therefore, the radar device 100 according to the first embodiment can be mounted at any place on the automobile, which is effective.

Second Embodiment

Figure 10:
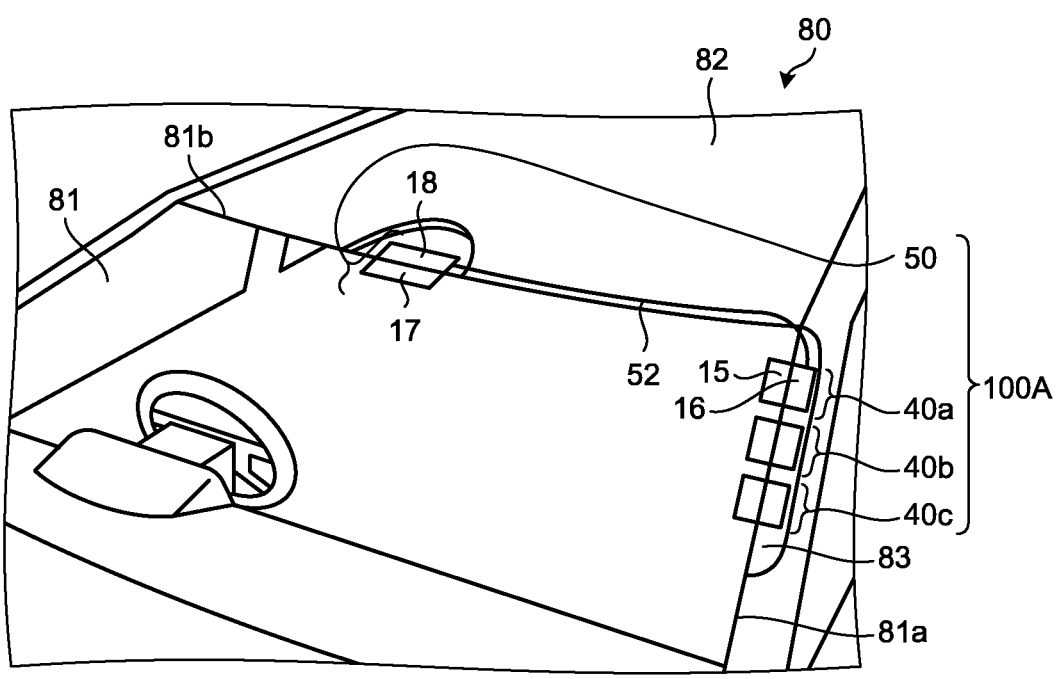
FIG. 10 is a diagram illustrating an example of a situation in which a radar device according to a second embodiment is disposed in an automobile.

FIG. 10 is a diagram illustrating an example of a situation in which a radar device 100A according to the second embodiment is disposed in the automobile 80. As illustrated in FIG. 10, the radar device 100A includes transmission modules 40a, 40b, and 40c, the reception module 50, and the connection cable 52. Each of the transmission modules 40a, 40b, and 40c is the same component as the transmission module 40 described in the first embodiment. That is, the radar device 100A according to the second embodiment uses three separate transmission modules each of which is the transmission module 40 described in the first embodiment. As in the first embodiment, each of the transmission modules 40a, 40b, and 40c includes the transmission circuit unit 16 accommodated in the A-pillar 83 and the transmission antenna 15 exposed on the windshield 81. Thus, the radar device 100A according to the second embodiment forms a virtual two-dimensional planar antenna using the three transmission modules 40 and the one reception module 50.

Figure 11:
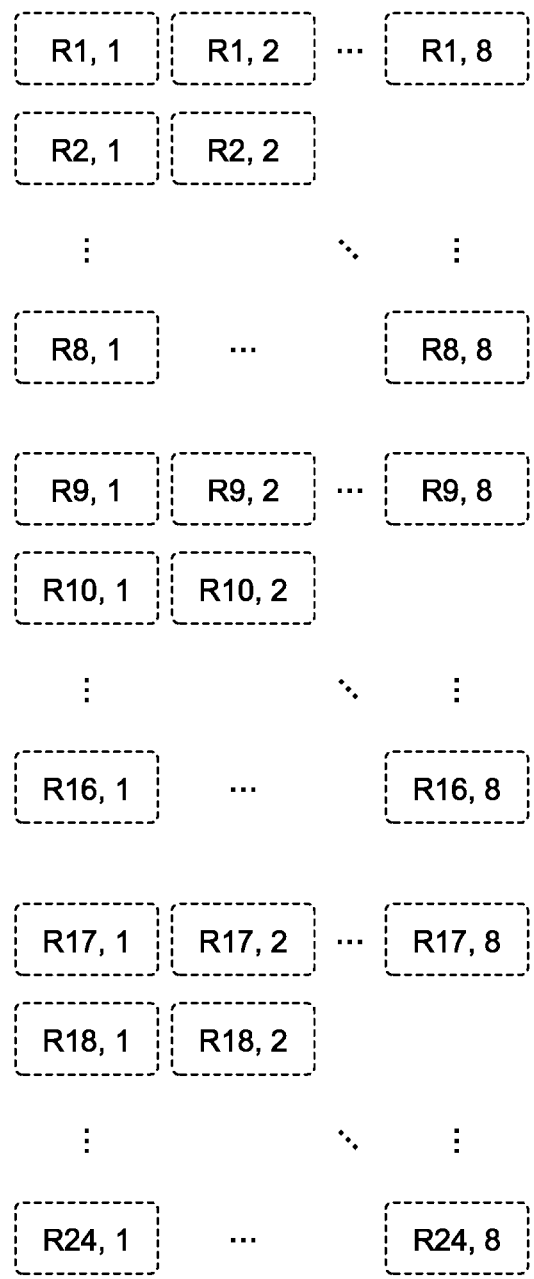
FIG. 11 is a diagram for explaining the concept of a virtual two-dimensional planar antenna in the second embodiment.

FIG. 11 is a diagram for explaining the concept of a virtual two-dimensional planar antenna 90A in the second embodiment.

In FIG. 11, the virtual transmission/reception channel in the first row and the first column represents the transmission/reception channel in a case where a signal from the first transmission channel of the transmission antenna 15 of the transmission module 40a is received at the first reception channel of the reception antenna 17. The virtual transmission/reception channel in the eighth row and the eighth column represents the transmission/reception channel in a case where a signal from the eighth transmission channel of the transmission antenna 15 of the transmission module 40a is received at the eighth reception channel of the reception antenna 17.

Further, in FIG. 11, the virtual transmission/reception channel in the ninth row and the first column represents the transmission/reception channel in a case where a signal from the first transmission channel of the transmission antenna 15 of the transmission module 40b is received at the first reception channel of the reception antenna 17. Considering the transmission antenna 15 of the transmission module 40a and the transmission antenna 15 of the transmission module 40b to be one virtual transmission antenna 15 enables the first transmission channel of the transmission antenna 15 of the transmission module 40b to be virtually handled as the ninth transmission channel. Therefore, this virtual transmission/reception channel can be handled with the label "R9, 1" assigned. The same applies to the others.

Further, in FIG. 11, the virtual transmission/reception channel in the seventeenth row and the first column represents the transmission/reception channel in a case where a signal from the first transmission channel of the transmission antenna 15 of the transmission module 40c is received at the first reception channel of the reception antenna 17. Considering the transmission antenna 15 of the transmission module 40a, the transmission antenna 15 of the transmission module 40b, and the transmission antenna 15 of the transmission module 40c to be one virtual transmission antenna 15 enables the first transmission channel of the transmission antenna 15 of the transmission module 40c to be virtually handled as the seventeenth transmission channel. Therefore, this virtual transmission/reception channel can be handled with the label "R17, 1" assigned. The same applies to the others.

Referring to FIG. 10, the transmission modules 40a, 40b, and 40c are disposed along the A-pillar 83, which extends the length of the transmission antenna 15 in the first direction x1, namely the longitudinal length of the transmission antenna 15. Generally, the area of an antenna is substantially proportional to its gain, and the observable distance increases as the area becomes larger. Therefore, the extension of the longitudinal length of the transmission antenna 15 can improve the detection performance.

In addition, the extension of the longitudinal length of the transmission antenna 15 can reduce the beam width in the vertical plane, so that the resolution in the vertical plane can be improved.

Although FIG. 10 illustrates an example in which the three transmission modules 40 and the one reception module 50 define the virtual two-dimensional planar antenna 90A, the present invention is not limited to this configuration. The number of transmission modules 40 may be other than three, and the number of reception modules 50 may be plural. The plural reception modules 50 can improve the detection performance and the resolution in the horizontal plane more than the one reception module 50.

As described above, the radar device 100A according to the second embodiment can form the virtual two-dimensional planar antenna 90A using the plurality of transmission antenna element groups defining the transmission channels and the plurality of reception antenna element groups defining the reception channels. Consequently, the effect of improving the detection performance, the resolution in the vertical plane, and the resolution in the horizontal plane can be achieved.

Note that the configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1, 1-1 to 1-$m$ transmitting element antenna; 2, 2-1 to 2-$n$ receiving element antenna; 3 power distributor; 4, 8 VCO; 5, 9 modulation circuit; 6 transmission control circuit; 7-1 to 7-$n$ mixer; 10-1 to 10-$n$ baseband amplifier; 11-1 to 11-$n$ ADC; 12 reception control circuit; 13 reference oscillator; 14 microcontroller; 15 transmission antenna; 16 transmission circuit unit; 16a transmission circuit unit IC; 16b, 19b peripheral electronic component; 16c, 19c circuit board; 16d, 19d solder ball; 16e, 19e ground conductor; 16f, 19f antenna substrate; 17 reception antenna; 18 reception unit; 19 reception circuit unit; 19a reception circuit unit IC; 20 signal processing unit; 22 non-volatile memory; 40, 40a, 40b, 40c transmission module; 50 reception module; 52 connection cable; 63, 73 antenna element; 63a first transmission antenna element group; 63b second transmission antenna element group; 63c third transmission antenna element group; 63d fourth transmission antenna element group; 64, 74 line; 73a first reception antenna element group; 73b second reception antenna element group; 73c third reception antenna element group; 73d fourth reception antenna element group; 80 automobile; 81 windshield; 81a first side; 81b second side; 82 roof; 83 A-pillar; 90, 90A two-dimensional planar antenna; 100, 100A radar device.

The invention claimed is:

1. A radar device including a transmission module to generate a radar signal and a reception module to receive a reflected wave of the radar signal, the transmission module and the reception module being separately mounted on an automobile,
the transmission module including:
a transmission circuit including a first voltage control oscillator to generate the radar signal on a basis of a reference signal; and
a transmission antenna to emit the radar signal into a space,
the reception module including:
a reference oscillator to generate the reference signal;
a reception antenna to receive the reflected wave of the radar signal from a target object; and
a receiver including:
a reception circuit including a second voltage control oscillator to generate a local signal on the basis of the reference signal, the reception circuit receiving an output from the reception antenna on the basis of the local signal; and
a signal processor to calculate target data on the basis of an output from the reception circuit, wherein
the transmission module includes a first substrate and a first circuit board, an entirety of the first circuit board being mounted on the first substrate,
the transmission circuit is mounted on a first surface of the first circuit board,
the first substrate is provided on a second surface side of the first circuit board, the second surface side of the first circuit board and the first surface of the first circuit board facing in opposite directions,
the transmission antenna is mounted on a second surface of the first substrate, and is not provided in a corresponding range on a back surface side of the first substrate, the corresponding range on the back surface side of the first substrate corresponding to a range in which the first circuit board is disposed on the first substrate,
the reception module includes a second substrate and a second circuit board, an entirety of the second circuit board being mounted on the second substrate,
the reception circuit is mounted on a third surface of the second circuit board,
the second substrate is provided on a fourth surface side of the second circuit board, the fourth surface side of the second circuit board and the third surface of the second circuit board facing in opposite directions,
the reception antenna is mounted on a fourth surface of the second substrate, and is not provided in a corresponding range on a back surface side of the second substrate, the corresponding range on the back surface side of the second substrate corresponding to a range in which the second circuit board is disposed on the second substrate, and
the second surface is a surface opposite to the first surface, and the fourth surface is a surface opposite to the third surface.

2. The radar device according to claim 1, wherein a ground conductor is provided between the first substrate and the first circuit board.

3. A radar device including a transmission module to generate a radar signal and a reception module to receive a reflected wave of the radar signal, the transmission module and the reception module being separately mounted on an automobile,
the transmission module including:
a transmission circuit to generate the radar signal; and
a transmission antenna to emit the radar signal into a space,
the reception module including:
a reception antenna to receive the reflected wave of the radar signal from a target object; and
a receiver including a reception circuit to receive output from the reception antenna and a signal processor to calculate target data on a basis of output from the reception circuit, wherein
the transmission module includes a first substrate and a first circuit board, an entirety of the first circuit board being mounted on the first substrate,
the transmission circuit is mounted on a first surface of the first circuit board, the first substrate is provided on a second surface side of the first circuit board, the second surface side of the first circuit board and the first surface of the first circuit board facing in opposite directions, the transmission antenna is mounted on a first surface of the first substrate, the first surface of the first substrate and the first surface of the first circuit board facing in opposite directions, the reception module includes a second substrate and a second circuit board, an entirety of the second circuit board being mounted on the second substrate, the reception circuit is mounted on a third surface of the second circuit board, the second substrate is provided on a fourth surface side of the second circuit board, the fourth surface side of the second circuit board and the third surface of the second circuit board facing in opposite directions, the reception antenna is mounted on a third surface of the second substrate, the third surface of the second substrate and the third surface of the second circuit board facing in opposite directions, and the first substrate and the second substrate are transparent substrates.

4. The radar device according to claim 1, wherein the transmission antenna and the transmission circuit are disposed along a first side of a windshield of the automobile, the reception antenna and the receiver are disposed along a second side of the windshield of the automobile, the first side is one of two sides among four sides of the windshield, the two sides being not parallel to ground, the four sides of the windshield includes two sides parallel to the ground, and the second side is an upper one of the two sides parallel to the ground, the transmission antenna and the reception antenna are exposed on the windshield, and the transmission circuit and the reception are accommodated in a structure that supports the automobile.

5. The radar device according to claim 4, wherein the transmission circuit is disposed in a front pillar, and the receiver is disposed in a roof.

6. The radar device according to claim 1, wherein the transmission circuit includes a plurality of transmission channels, supplies power to each of the plurality of transmission channels, and generates the radar signal, the transmission antenna includes a plurality of transmission antenna element groups defining the transmission channels, the reception circuit includes a plurality of reception channels, and receives an output from the reception antenna at each of the plurality of reception channels, the reception antenna includes a plurality of reception antenna element groups defining the reception channels, and the plurality of transmission antenna element groups and the plurality of reception antenna element groups form a virtual two-dimensional planar antenna.

7. The radar device according to claim 6, wherein at least one of the transmission module and the reception module is plural in number.

8. The radar device according to claim 3, wherein the transmission antenna and the transmission circuit are disposed along a first side of a windshield of the automobile, the reception antenna and the receiver are disposed along a second side of the windshield of the automobile, the first side is one of two sides among four sides of the windshield, the two sides being not parallel to ground, the four sides of the windshield includes two sides parallel to the ground, and the second side is an upper one of the two sides parallel to the ground, the transmission antenna and the reception antenna are exposed on the windshield, and the transmission circuit and the reception are accommodated in a structure that supports the automobile.

* * * * *